United States Patent
Salkini et al.

(10) Patent No.: US 8,254,886 B2
(45) Date of Patent: *Aug. 28, 2012

(54) INTELLIGENT NETWORK ACCESS CONTROLLER AND METHOD

(75) Inventors: Jay Salkini, Columbia, MD (US); Thomas V. Joseph, III, Lothian, MD (US); Youssef J. Dergham, Westminister, MD (US)

(73) Assignee: Tecore, Inc., Columbia, MD (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/585,362

(22) Filed: Sep. 14, 2009

(65) Prior Publication Data
US 2010/0159879 A1 Jun. 24, 2010

Related U.S. Application Data

(63) Continuation-in-part of application No. 12/318,020, filed on Dec. 19, 2008.

(51) Int. Cl.
*H04M 1/66* (2006.01)
*H04M 1/68* (2006.01)
*H04M 3/16* (2006.01)

(52) U.S. Cl. ........................................ 455/411

(58) Field of Classification Search ................. 455/411
See application file for complete search history.

(56) References Cited

U.S. PATENT DOCUMENTS

| | | | |
|---|---|---|---|
| 5,440,758 A | 8/1995 | Grube et al. | |
| 6,343,212 B1 | 1/2002 | Weber et al. | |
| 6,603,397 B2 | 8/2003 | Bronson | |
| 6,625,455 B1 | 9/2003 | Ariga | |
| 7,046,990 B2 | 5/2006 | Grego et al. | |
| 8,078,190 B2 | 12/2011 | Noonan et al. | |
| 2002/0098850 A1 | 7/2002 | Akhteruzzaman et al. | |
| 2006/0105758 A1 | 5/2006 | Maislos | |
| 2008/0057976 A1 | 3/2008 | Rae et al. | |
| 2008/0146158 A1 | 6/2008 | Pan et al. | |
| 2010/0159877 A1* | 6/2010 | Salkini et al. | 455/411 |
| 2010/0159879 A1* | 6/2010 | Salkini et al. | 455/411 |

* cited by examiner

*Primary Examiner* — William D Cumming (57) ABSTRACT

An intelligent network access controller for use with a wireless network that provides communications services to subscribers having wireless communications devices includes a multi-protocol interface for receiving and sending digital messaging by the wireless communications devices; an identification module that determines an identity of a wireless communications device; an access module that receives the identity and determines an access level for the wireless communications device; and a locking module that locks selected wireless communications devices to the controller based on the determined access level.

35 Claims, 7 Drawing Sheets

INTELLIGENT NETWORK ACCESS CONTROLLER AND METHOD

RELATED APPLICATIONS

This application is a continuation-in-part of U.S. patent application Ser. No. 12/318,020, entitled "Intelligent Network Access Controller and Method," filed Dec. 19, 2008.

TECHNICAL FIELD

The technical field is wireless communications.

BACKGROUND

A key performance indicator of any wireless network is coverage. In addition to providing an evolving set of features to customers, the most successful wireless networks are those that provide ubiquitous coverage and service to as broad a base of subscribers as possible. Because of the emphasis on coverage, these same networks seldom, if ever, provide methods of restricted or controlled access for targeted areas in the network. However, with heightened security concerns, and for other reasons, targeted wireless access restriction may be an important consideration, especially in a localized area, and/or for specific time periods.

SUMMARY

An intelligent network access controller (INAC) creates a local wireless network and dynamically controls access by wireless devices to a macro wireless network underlying the local wireless network. The INAC includes means for registering the wireless devices, wherein the devices are identified and classified, and wherein the devices comprise one of allowed, restricted, and unknown; means for dynamically determining characteristic values of the devices; means for granting access by the devices to the macro network based on the dynamically determined characteristics of the devices; and means for locking devices to the local wireless network based on the dynamically determined characteristics.

A method for controlling access by wireless devices to a macro wireless network comprises the steps of establishing a local wireless network having a determined RF coverage area as an overlay to the macro wireless network; detecting when the devices enter the RF coverage area of the local wireless network; dynamically determining one or more characteristics of the devices and one or more characteristics of the RF coverage area; and based on the dynamically determined characteristics, either locking the devices to the local wireless network, or passing the devices to the macro wireless network.

DESCRIPTION OF THE DRAWINGS

The detailed description will refer to the following figures in which like numerals refer to like items, and in which.

DETAILED DESCRIPTION

A key performance indicator of any wireless network is coverage. The most successful wireless networks are those that have ever-expanding coverage, independent of time, to provide ubiquitous service to any and all subscribers and roaming users. Because of the emphasis on coverage, these same networks seldom, if ever, operate so as to restrict access. However, with heightened security concerns, and for other reasons, wireless access restriction may be an important consideration, especially in a localized area, and/or for specific time periods.

Current systems that impose some type of wireless access restriction function may employ jamming equipment to block wireless signals in a particular area. Other systems rely on shutdown of a cell or sector. These current wireless access restriction solutions do not discriminate among users. Instead, these solutions impose a total prohibition on wireless communications. Furthermore, these current solutions are complicated and expensive to invoke. Finally, with these current solutions, if a situation requires that certain personnel (e.g., emergency response personnel) be able to communicate using wireless communications, a secondary communications network must be established since jamming or cell shutdown prohibits all wireless communications for a given technology.

In most cases jamming technology that is deployed works across a spectrum of radio frequencies and jams the use of the entire spectrum regardless of the technology or technologies deployed in the spectrum. So in the case of jamming, a localized communications network must be established on its own technology, unique devices, and spectrum further complicating the setup and operations.

Another challenge is that in most areas covered by wireless communications there are typically multiple technologies operating in a variety of spectrum ranges. Jamming solutions and cell turn down are absolute solutions that do not provide the ability to select on a device by device basis the ability to use the wireless communication within the target area.

To overcome these limitations with current art wireless communication access restriction solutions, disclosed herein is an intelligent network access controller, and accompanying method, which is shown in flow chart form in FIGS. 7A-7D, that either permanently or temporarily limits allowable communications on an existing wireless network or wireless networks to only a subset of that network's normal users. Those users not in the subset of allowable users are blocked from access to the wireless network in a specified area normally covered by the network and/or for a specified time.

The intelligent network access controller provides, on a single platform, the necessary components for an end-to-end solution for selective communications restriction across the spectrum of wireless technology, frequency, and access methodology. In an embodiment, wireless users are classified into categories and either allowed to access the wireless networks or are prohibited access, on a subscriber-by-subscriber basis. The intelligent network access controller meets the criteria of service restriction that may be required in specific areas, while allowing selected individuals wireless communications access to wireless networks in those same areas. Thus, the intelligent network access controller eliminates the need to overlay additional communications systems to provide targeted localized wireless communications. The intelligent network access controller implements its service across both commercial as well as private wireless networks.

The intelligent network access controller is particularly useful in certain permanent facilities such as embassies, government facilities, prisons, military installations, stadiums and arenas, hospitals, public transportation facilities, landmarks, and in temporary applications including disaster recovery operations and homeland security operations. In short, the intelligent network access controller can be used in any situation or at any facility or locale to establish a controlled wireless communications environment whereby only selected individuals can access a wireless communications network.

Figure 1A:
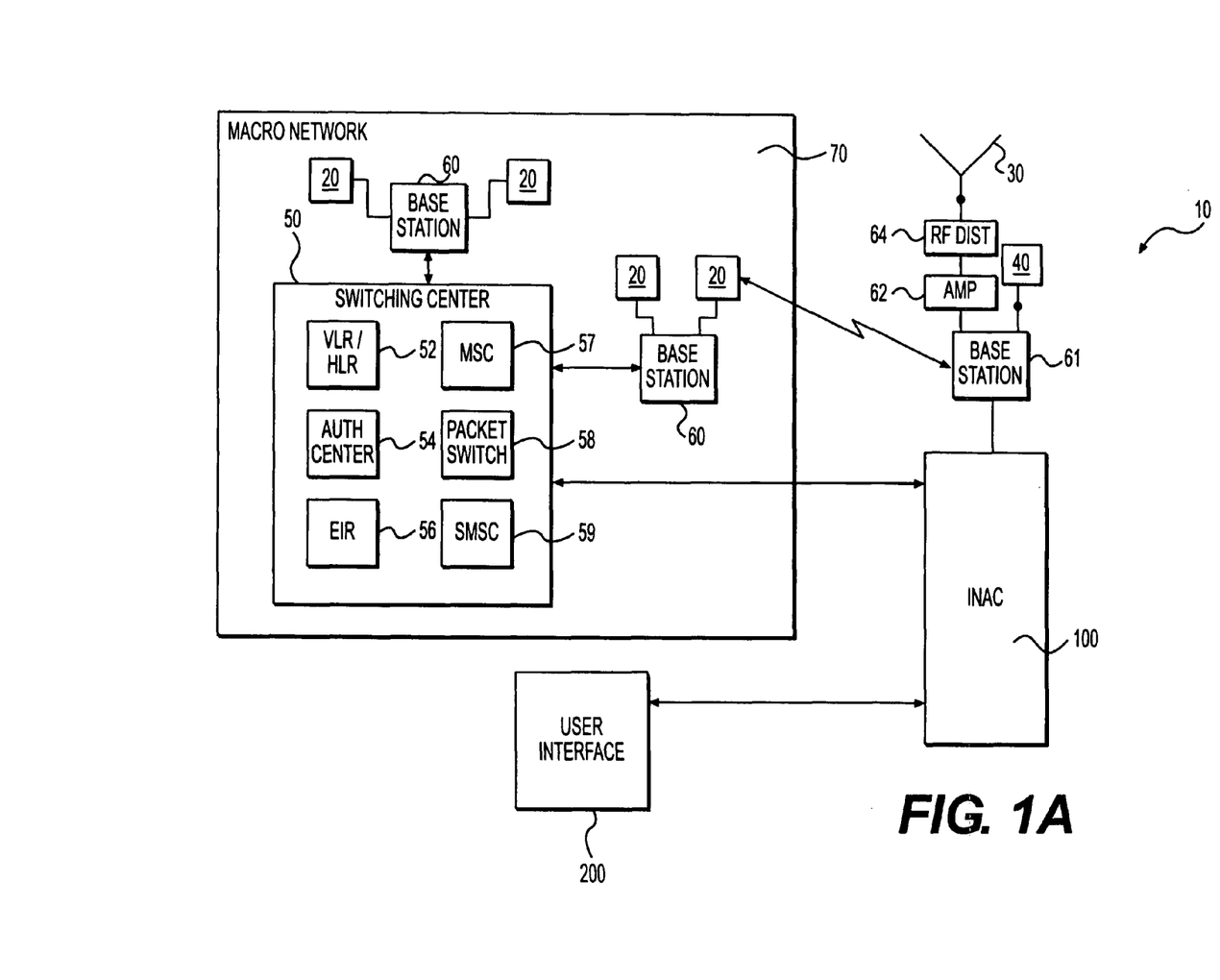
FIG. 1A is a block diagram of a wireless network incorporating an exemplary intelligent network access controller.
Figure 7A:
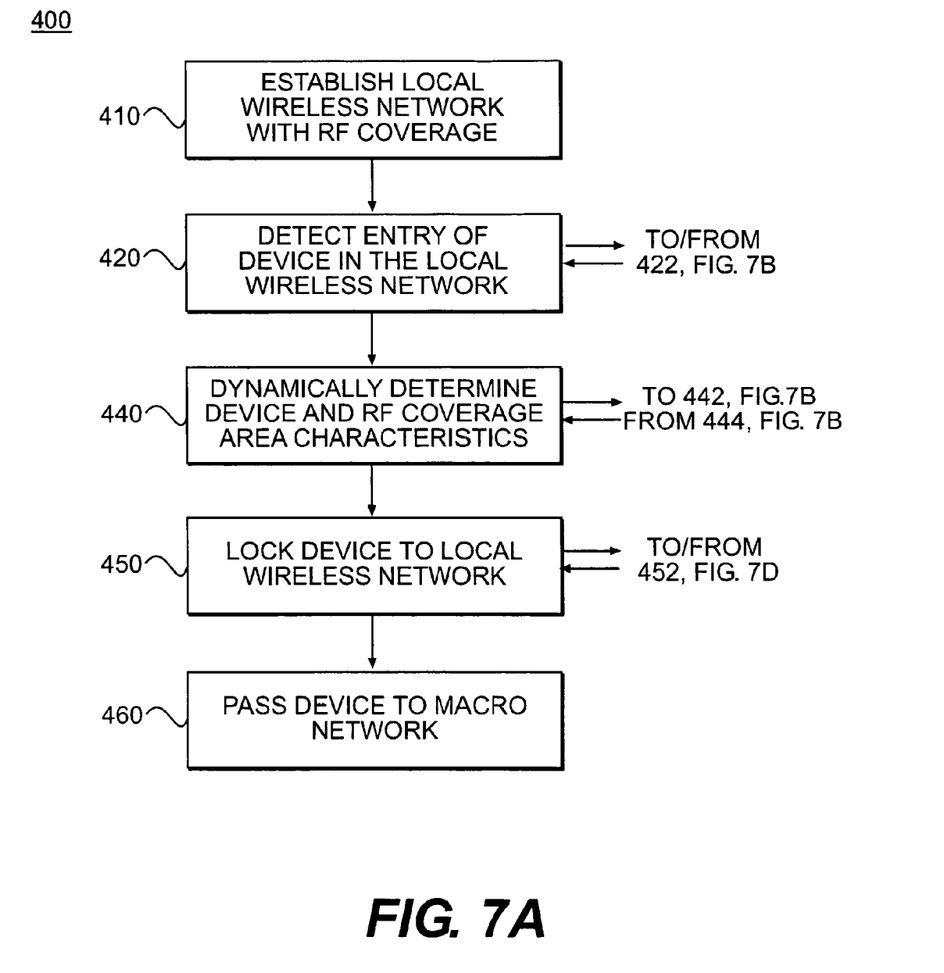
Figure 7B:
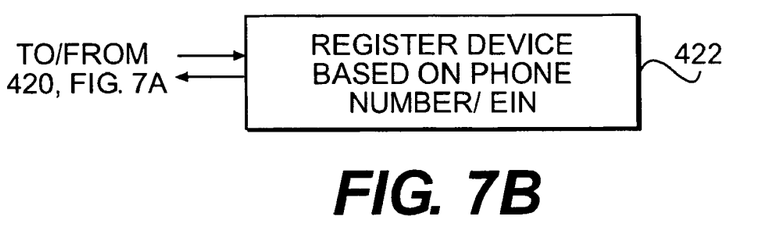

FIG. 1A is a block diagram of a wireless communications network that incorporates an exemplary intelligent network access controller and other wireless network components to provide access restriction features. In FIG. 1A, local wireless network 10 operates as shown in FIG. 7A, block 410 to create an overlay or underlay to a normal, existing, or macro wireless network 70. The local network 10 includes directional antennae 30, repeaters 40, base station(s) 61, amplifier 62, and radio frequency (RF) distribution equipment 64, all of which operate in conjunction with intelligent network access controller (INAC) 100 to restrict or to allow wireless communication from and to selected devices 20.

The macro wireless network 70 includes switching center 50 and base stations 60, through which devices 20 establish wireless communications with the macro wireless network 70. The switching center 50 includes standard components that may be found in any switching center, including a VLR and a HLR 52, authentication center 54, equipment identification register 56, a mobile switching center (MSC) 57, a packet switch 58 and a short message service center (SMSC) 59. Ordinarily, a subscriber using a device 20 would have that device 20 registered with a macro network 70 once the device 20 was within the coverage area of the macro wireless network 70. (See FIG. 7A, block 420 and FIG. 7B, block 422). However, to provide access restriction on either a temporary or a permanent basis, the INAC 100, and associated interface 200, which facilitates human operator interaction with the controller 100, may be used to "lock" selected devices 20 to the INAC 100 and thus prevent or limit access to the macro wireless network 70.

"Locking" the wireless devices to the INAC 100, as provided for in FIG. 7A, block 440, indicates that the wireless device 20 is tuned to and has been accepted by the local signal broadcast of the INAC 100 and the local wireless network 10. The INAC 100 implements a mimicked signal that follows the signal patterns, parameters, and characteristics of the underlying macro wireless network 70; however the localized signal is only connected to the INAC 100 and not the macro wireless network 70. The end result is a wireless device 20 that has the appearance, to the wireless device user, of operating on the macro wireless network 70; however by virtue of the wireless device 20 being tuned ("locked") to the local INAC 100 signal, as per FIG. 7A, block 450, the wireless device 20 is (except in limited circumstances described later) by default "blocked" from access to the macro wireless network 70 outside the coverage area of the INAC 100 (i.e., outside the local wireless network 10).

A "device" or "wireless device" includes any wireless access mechanism including wireless handheld devices used for communications and laptop computers, personal digital assistants, or other computing device that includes wireless access technology.

A "wireless network" includes networks that provide commercial or private wireless access for voice, text, and or data access.

The INAC 100 may be implemented as an adjunct to the macro wireless network 70, as an integrated feature within the wireless network 70, or, as shown in FIG. 1A, may be implemented as a standalone device that is independent of any specific macro wireless network 70. In any configuration, the INAC 100 is capable of creating its own "local" wireless network (e.g., the local wireless network 10).

The INAC 100 may be implemented as software, hardware, or a combination of hardware and software. The INAC 100 may be implemented on a suitably programmable processor.

Figure 1B:
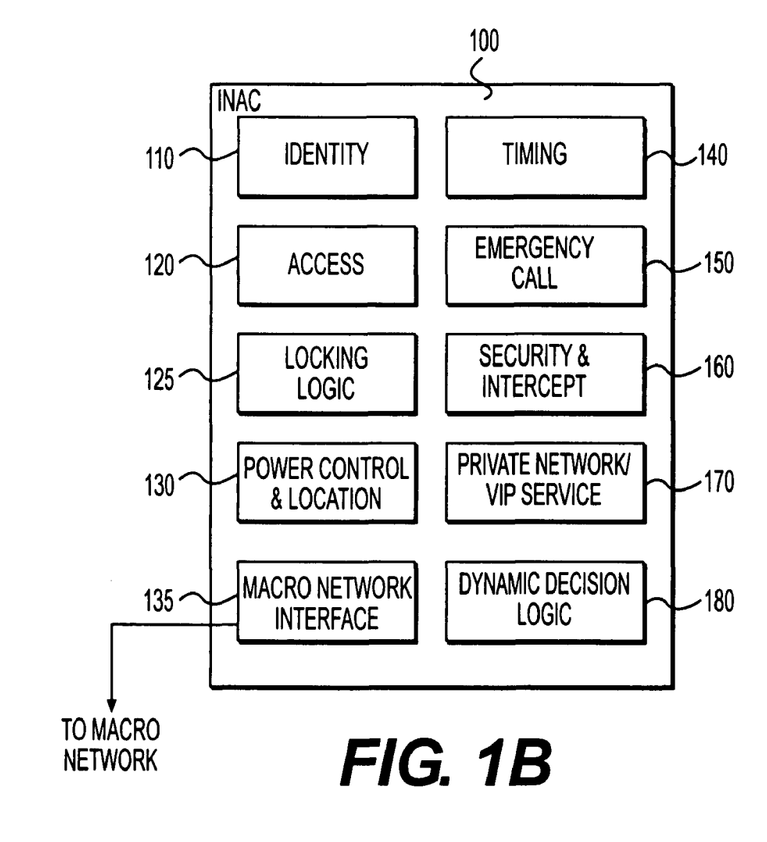
FIG. 1B is a more detailed block diagram of the exemplary intelligent network access controller of FIG. 1A.
Figure 7C:
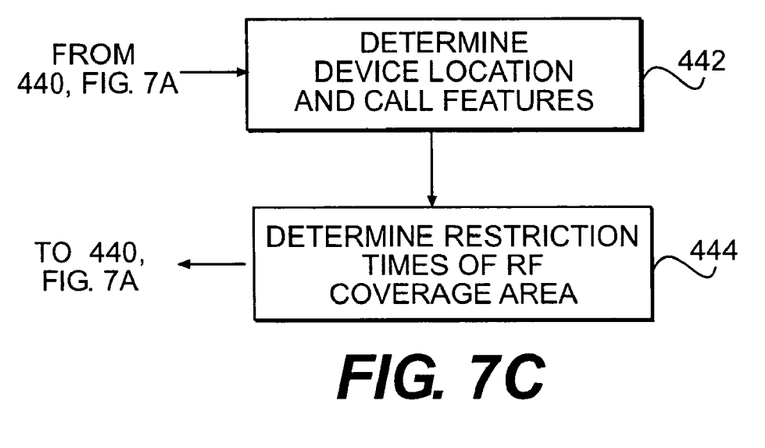

FIG. 1B is a more detailed block diagram of the INAC 100. The INAC 100 includes equipment identity module 110 that receives and stores identifying information associated with devices 20; access module 120 that determines, based on setup or operational mode of the INAC 100, which of the devices 20 are to be allowed access to the wireless communications network 10; locking module 125, which is used to lock a device 20 to the INAC 100 and to provide indications to the locked device 20 that make it appear that the device 20 actually is registered with the wireless network 10; power control and location module 130, which operates in conjunction with base station 61, RF distribution equipment 64, amplifiers 62, directional antennae 30, and repeaters 40 to establish the area or volume subject to the access restrictions imposed by the INAC 100, and to locate and optionally track wireless devices in or near the area or volume of the local wireless network 10; macro network interface module 135, which connects the network 10 with one or more macro, or established, wireless networks 70, and allows communications between the network 10 and the macro networks 70; timing module 140, which may be used to impose temporal limitations on the access restriction functions as shown in FIG. 7C, block 444; emergency access module 150, which operates to allow certain access types (e.g., emergency 911 calls from a wireless device 20) while other access types remain blocked; security & intercept module 160, which provides for monitoring of certain communications locked to the network 10; private network module 170, which operates to create a private wireless network for users of certain devices 20; and dynamic decision logic 180, which provides coordination and control of the functions of the INAC 100, including the ability to dynamically change control features, as per FIG. 7A, block 440, based on changing events and conditions in the area covered by the network 10.

Boundaries (i.e., the coverage area) of the local wireless network 10, and its many sub-elements, can be static (i.e., fixed in place geographically) or dynamic (i.e., changing with time). Thus, for example, an extent of a private wireless network within the local wireless network 10 can be less that the coverage area of the local wireless network, and can be moveable within the local wireless network 10. The boundaries of the local wireless network 10 can extend over two dimensions (i.e., latitude and longitude) to create a coverage area, or over three dimensions (i.e., including altitude) to create a coverage volume. When used hereinafter, volume and area are intended to refer to the same concept, namely the volume or area, depending on the circumstances, subject to control by the INAC 100. As will be explained later, the local wireless network 10 may comprise an effective coverage volume defined by the signal strength of the installed RF equipment. However, the actual coverage volume of the local wireless network 10 (i.e., the volume in which wireless devices 20 may be locked to the INAC 100) may be limited to a volume less than the effective coverage volume.

The identity module 110 serves to determine an identity of a device 20 that is within the coverage area of the local network 10. Such identity may be by means of the device's telephone number or equipment identification number 110, as per FIG. 7B, block 422, among other means. The module 110 also serves to classify, as per FIG. 7C, block 442, the device 20. For example, a device 20 may have other access limitations embedded, such as a limited number of outgoing call numbers the device 20 can dial, or the device 20 may be limited to calling only 911 or other emergency services. The classification of the device 20 may be used to limit, deny, or allow communication with the macro wireless network 70 while the device 20 is within the coverage area of the local wireless network 10. A device 20 that cannot be identified may be categorized as restricted (see below) and such device 20 would then be locked to the INAC 100.

Through the access module 120 and the locking module 125, the INAC 100 provides discretionary blocking of access to and from devices 20 by recognizing differences among the devices 20. In an embodiment, the INAC 100 recognizes three categories of subscriber devices 20: restricted, allowed, and unknown. Restricted devices are those that are identified as belonging to subscribers who are to be denied wireless access (e.g., prisoners, terrorists). Restricted devices are configured by the INAC 100 so as not to be allowed cellular service and access to the wireless network 10. Every device 20 has a unique identifying number or characteristic. If the device identifying number or characteristic (e.g., subscriber number) is configured to be "restricted," the INAC 100 accepts that device's access and returns a positive acknowledgement to the device. This creates the illusion, at the subscriber's device 20, that the subscriber has gained access to and is operating within the macro wireless network 70, when, in fact, the device 20 is locked to the INAC 100 until the device 20 is removed from the restricted access area imposed by the INAC 100. By locking the "restricted" device 20 to the INAC 100, all incoming and outgoing accesses by the device 20 may be prevented while the "restricted" device 20 is within the restricted access area.

A restricted device category may change dynamically, as shown in FIG. 7A, block 440. For example, a device 20 that incorporates a camera may be classified in the restricted category in some local wireless network applications (e.g., an operatic performance where photographs and video are prohibited) but classified as an allowed device in other local networks. Alternatively, a device having a camera may have its data functions locked to the local wireless network but other functions (voice and text) allowed.

Allowed devices are those configured in the INAC 100 as to be allowed wireless service. After determining the identity of the device 20, and determining that the device 20 is an "allowed" device, the INAC 100 redirects the device 20 from the INAC 100 to the appropriate macro wireless network 70, as shown in FIG. 7A, block 460. This redirection forces the "allowed" device to reattempt access on the wireless network 70. Once so redirected, the "allowed" device's subscriber can use the device 20 for normal inbound and outbound traffic.

Unknown devices 20 are those not specifically identified and configured by the INAC 100 as allowed or restricted. Unknown devices 20 may be configured to allow normal wireless network access depending, for example, on a security level requirement at a given location (e.g., for homeland security threat conditions of orange and lower, unknown devices are allowed access to the wireless network 10).

The INAC 100 operates to create a local overlay or underlay of the same frequency spectrum and configuration as the macro wireless network 70, as shown in FIG. 7A, block 410. The area of restricted access can extend to any part of the coverage area of the macro wireless network 70, and such restricted area may be enforced by the use of the power control and location module 130, directional antennae 30, and repeaters 40. Thus, the restricted area under control of the INAC 100 may be limited to a building, a sports stadium, or a geographical area, for example. Furthermore, although the coverage area of the local wireless network 10 ordinarily might extend beyond the boundaries of the building, sports stadium, or geographical area, by imposing boundary constraints, the enforced coverage area of the local wireless network may match precisely the extent of the actual boundaries of the building, sports stadium, or geographical area.

The area of restricted wireless access is not necessarily static, and can be changed based on set criteria, variable (dynamically changing) criteria, or at the discretion of a network operator, as shown in FIG. 7A, block 440. The end result is a targeted coverage area that can provide controlled and deterministic wireless communications access by subscribers. Once a restricted, or an unknown, subscriber's device 20 leaves the restricted access area, the subscriber's device 20 re-registers with the macro wireless network 70 and is no longer controlled (locked) to the INAC 100.

The power control and location module 130 includes the processing component algorithms and databases (a device location sub-module, not shown in FIG. 1B) needed to determine the location of a device 20 relative to the coverage area imposed by INAC 100 (i.e., the local wireless network 10 coverage area). See FIG. 7C, block 442. The module 130 may determine location based on a GPS signal provided in conjunction with operation of the device 20. For example, the device 20 may query a GPS satellite to obtain geographic location information. The GPS-provided information may be used to both initially locate the wireless device 20, and subsequently to track the wireless device 20. The wireless device 20 also may be tracked by a dead reckoning process. When locked to the INAC 100, the same query from the device 20 may cause the location information to be provided to the module 130. The module 130 also may take advantage of location information provided by components of the macro wireless network 70, by local network 10-dedicated cell detection components, or by a process of database correlation to geo-locate the device 20. For example, using triangulation mechanisms, two or more receiving units of the networks 10 or 70 may measure radiated power (signal strength) from the device 20, send the signals to the INAC 100, where the module 130 computes circular location information and determines a point of intercept that corresponds to the location of the device 20. The module 130 can implement other triangulation techniques and similar processes may be used for other signals. The module 130 also may determine altitude of the device 20, in addition to latitude and longitude. One means for determining altitude is by computing slant range based on angle of arrival information. Another altitude measurement technique involves proximity to equipment of the networks 10 or 70 that are at a known altitude. Well-known location information mechanisms also may be incorporated into the module 130.

The module 130 may rely on using voice recognition to determine the position location of a device 20.

The module 130 may rely on covertly activating a device 20 to determine the position location of a device 20. This activation may include the use of a camera of microphone of a device 20 to gather information about the device 20 position location.

The module 130 may rely on the underlying macro wireless network 70 for position location of a device 20. For example, once a device 20 is identified as somewhere within the RF coverage area created by the INAC 100, the module 130, in conjunction with the module 135, may send a short message to corresponding equipment in the macro wireless network 70. That equipment has the geographic location of the device 20, and can continue to track the location of the device 20. The device location equipment of the macro wireless network 70 then can send the geographic location of the device 20 to the module 130, and can update the location as the device 20 is moved within the coverage area of the local wireless network 10.

The module 130 also may determine device location based on database correlation techniques. For example, each point (location defined with some degree of granularity) in the coverage area of the local wireless network 10 may have associated location characteristics, and a database of those characteristics may be incorporated into the module 130, along with algorithms to recognize and process the characteristics data. Upon receiving such characteristics data associated with a specific device, the module consults the characteristics database to see if the received characteristics correspond to any of the defined points in the coverage area. These characteristics include signal strength of the device 20, measured angle of arrival of a signal, intercept by one specific wi-fi point, time of entry within the RF coverage area of the local wireless network 10, and other characteristics.

Once the module 130 determines location (x, y, z (optional)) of the device 20, that location can be compared, see FIG. 7A, block 440 and FIG. 7C, block 442, to the intended boundaries of the local wireless network 10, and if the device 20 is within the boundaries, the device either can be denied full access, given some form of restricted access, or given full access.

When the subscriber's wireless device 20 is locked to the INAC 100, the locking module 125, in an embodiment, operates to ensure that the device's display and apparent operation are the same as if the device 20 were registered with the macro wireless network 70. In an embodiment, a subscriber who attempts to use a device 20 locked to the INAC 100 will see a failed access attempt, or similar warning. The subscriber's perception would likely then be that the device 20 was not receiving sufficient signal strength to enable wireless communications or the serving wireless network, did not have the requisite capacity to service the access request. This further masks the purpose and operation of the INAC 100. Only after a repeated pattern of access denial is established would the typical subscriber discern the restricted access.

In another embodiment, certain subscribers may be allowed to place calls under control of the INAC 100. For example, and as will be described later, the security & intercept module 160 may be used to monitor and locally record certain conversations from devices 20 within the coverage area of the local wireless network 10.

The macro network module 135 operates to connect the INAC to corresponding control equipment of the macro wireless network 70, and to communicate (send messages) between networks 10 and 70. The module 135 also may be used in connection with the security & intercept module 160 to monitor and record communications from selected devices 20 using equipment of the macro wireless network 70.

The timing module 140 may be programmed for, or may generate signals to limit access of devices 20 based on time of day, day of week, specific dates, or any event for which a time base can be established, as shown in FIG. 7C, block 444. Time may be determined based on defined start and stop times/days, or by a start time/day and a duration.

Figure 3:
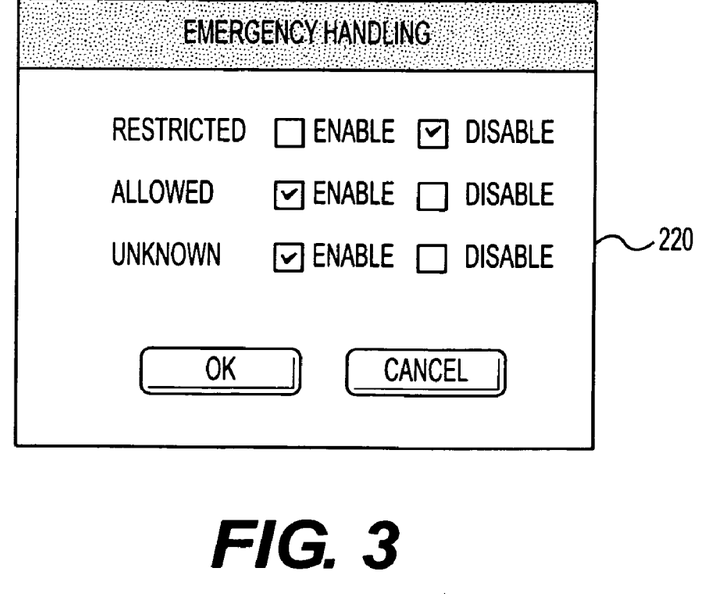
FIG. 3 illustrates an exemplary interface for enabling emergency access.

The emergency call module 150 can be used to grant limited exceptions to access restrictions otherwise imposed on the local wireless network 10. For example, an otherwise restricted device 20 may be allowed to make a 911 call. the module 150 includes the programming needed to recognize such an emergency call, and, based on pre-established rules, either allow or disallow the call. For example depending on the type of installation and the security requirements, emergency access may need to be available, and thus may be enabled or disabled. Emergency access can be configured based on each type of subscriber device; restricted, allowed, or unknown. FIG. 3 is an interface 220 that allows a system operator to enable or disable emergency access for each of the three subscriber device types (restricted, allowed, unknown). When emergency access is enabled, the emergency access module 150 of the INAC 100 allows the subscriber's device 20 to be redirected to the macro wireless network 70 when that device 20 dials an emergency access number such as 911. Upon completion of the emergency access, the subscriber's device 20 returns to a locked to INAC condition, as appropriate. When emergency access is disabled, the INAC 100 ignores all call access from subscribers whose devices 20 are locked to the INAC 100.

Returning to FIG. 1B, the INAC 100 may include an optional security and intercept module 160 that is used for lawful intercept of wireless communications using a direct Internet connection (or other available connection type) to a monitoring station. When enabled at the INAC 100, the security and intercept module 160 allows law enforcement personnel to monitor and record conversations and data transfers (packet and circuit), call signaling messages, accessed features, and SMS originated or terminated messages for targeted wireless devices that are currently locked to the INAC 100 and allowed localized services on the INAC 100 system.

Figure 7D:
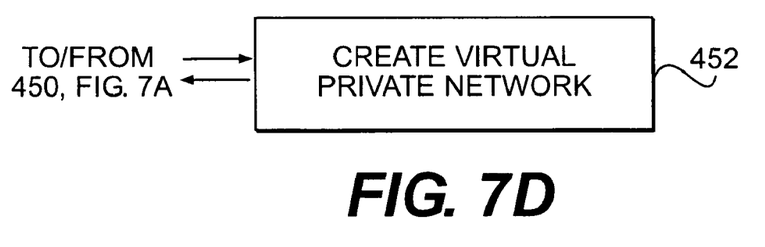

When the INAC 100 operates to restrict wireless communications by way of a wireless network, there may still be a need to provide some form of private network communications in the wireless access limited area, as shown in FIG. 7D, block 452. To provide this additional functionality, the INAC 100 may include the private network module 170, which allows for limited wireless voice communications using either a commercial technology such as GSM or CDMA, or voice over IP (VoIP) technology, including session initiated protocol/unlicensed mobile access (SIP/UMA). As additional wireless technologies become viable, these can be added to the private network solution as well. The private network module 170 also allows for connection to a PBX or PSTN.

The INAC 100 can be configured to provide various levels of access depending on the configuration of the subscriber devices 20 and the level of security required for the access. Under control of the dynamic decision logic module 180, the INAC's operational mode may be changed dynamically, either automatically, or manually. The module 180 considers inputs from other modules of the INAC 100 and processes these inputs to arrive at a operational mode configuration. Automatic changes may be programmed using the interface 200. Examples of automatic changes are changes programmed into the INAC 100 based on time of day, day of week, or some other calendar-based criteria; the occurrence of a specific event (e.g., a concert); changes in threat levels (e.g., homeland security threat conditions—yellow, orange, etc.); and changes in an operational profile or physical location (of the INAC 100 or of the wireless device 20) (e.g., an aircraft descending below 10,000 feet, a ship entering port, a train arriving at a station). In addition, the module 180 dynamically resolves conflicts between inputs from the other INAC 100 modules. For example, the access module 120 may allow access at a specific location while the power control and location module 130 disallows access. Any such conflicts are resolved by the module 180. One such means for conflict resolution is to prioritize inputs from the various modules so that the competing module with the highest priority always wins.

The INAC 100 may be programmed with dynamic trigger points that change a mode of operation of the INAC 100 with respect to all devices 20, a specific class of devices 20, or a specific (individual) device 20, as shown in FIG. 7A, block 440. For example, if the INAC 100 detects an influx of 1,000 pre-paid devices 20 within the local wireless network 10 over a given period, the INAC 10 may block any further pre-paid devices 20, and/or may block any or all of the initial 1,000 pre-paid devices. In another example, if an otherwise restricted device 20 is used to attempt a call to one specific Manual changes may be implemented directly by a system operator by using the interface 200. For any of the modes of operation, the INAC 100 provides a logging mechanism to track all system access attempts and the resulting status. Additionally the INAC 100 provides capability to view the existing database information including the allowed and restricted lists, system configuration, system statistics, and log of system activity.

Figure 2:
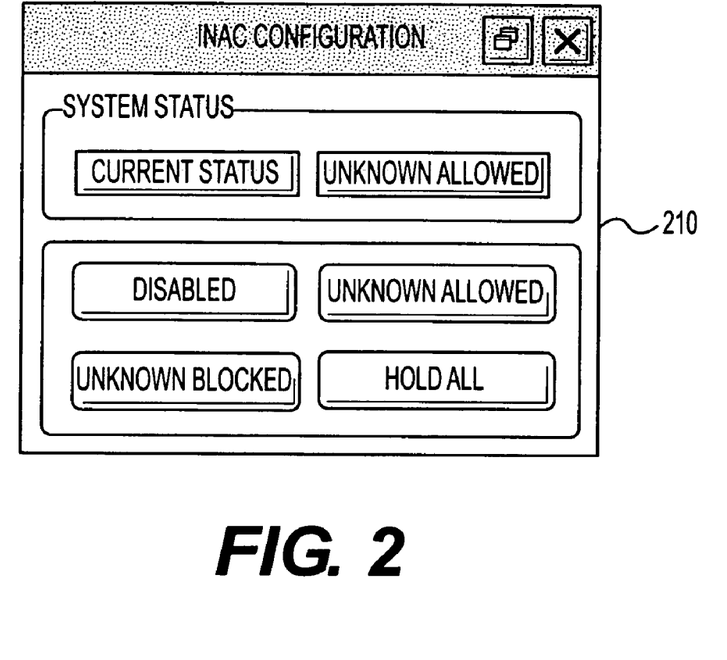
FIG. 2 illustrates an exemplary interface for enabling wireless access restrictions using the controller of FIG. 1B.

The INAC's operational modes include disabled, wherein the access restrictions imposable by the INAC 100 are suspended; hold all, or virtual jam, wherein all wireless communications are processed as locked to the INAC 100; unknown allowed, wherein only known "restricted" devices are locked to the INAC 100; and unknown blocked, in which both restricted and unknown devices are locked to the INAC 100. FIG. 2 illustrates an exemplary interface 210 produced by the interface 200 and the INAC 100 for enabling wireless access restrictions. Additionally, the INAC 100 can also operate in a passive mode where all subscriber access is redirected to the appropriate wireless network.

As subscribers access the INAC 100, and either are locked to the INAC 100 or redirected to the macro wireless network 70, the INAC 100 captures access information that can be used to generate access reports for each type of device 20 (i.e., unknown, allowed, restricted). The reports provide an organized analysis as to which users are accessing the system, including time period, call duration, and frequency of use. The reports also provide useful information for establishing system databases and use of the INAC 100.

The INAC 100 provides for location sensitive operations, an example of which, as noted above, involves a aircraft. The INAC 100 may be installed on an aircraft so that certain devices (e.g., those of crew members) may be used for wireless communications at any time. Alternatively, the INAC 100 may be used to control access to wireless communications based on the aircraft's location (latitude, longitude, and altitude) or any aspect or aircraft operation There are many possible deployment options for the INAC 100. For example, the INAC 100 may be implemented as a permanent part of the macro wireless network 70. The INAC 100 also may be implemented as a stand alone device that overlays one or more wireless communications networks so that all wireless communications in a specific location are capable of some form of access restriction. One example of this wireless feature is to establish an INAC 100 at a building, a facility, or a campus.

Figure 4:
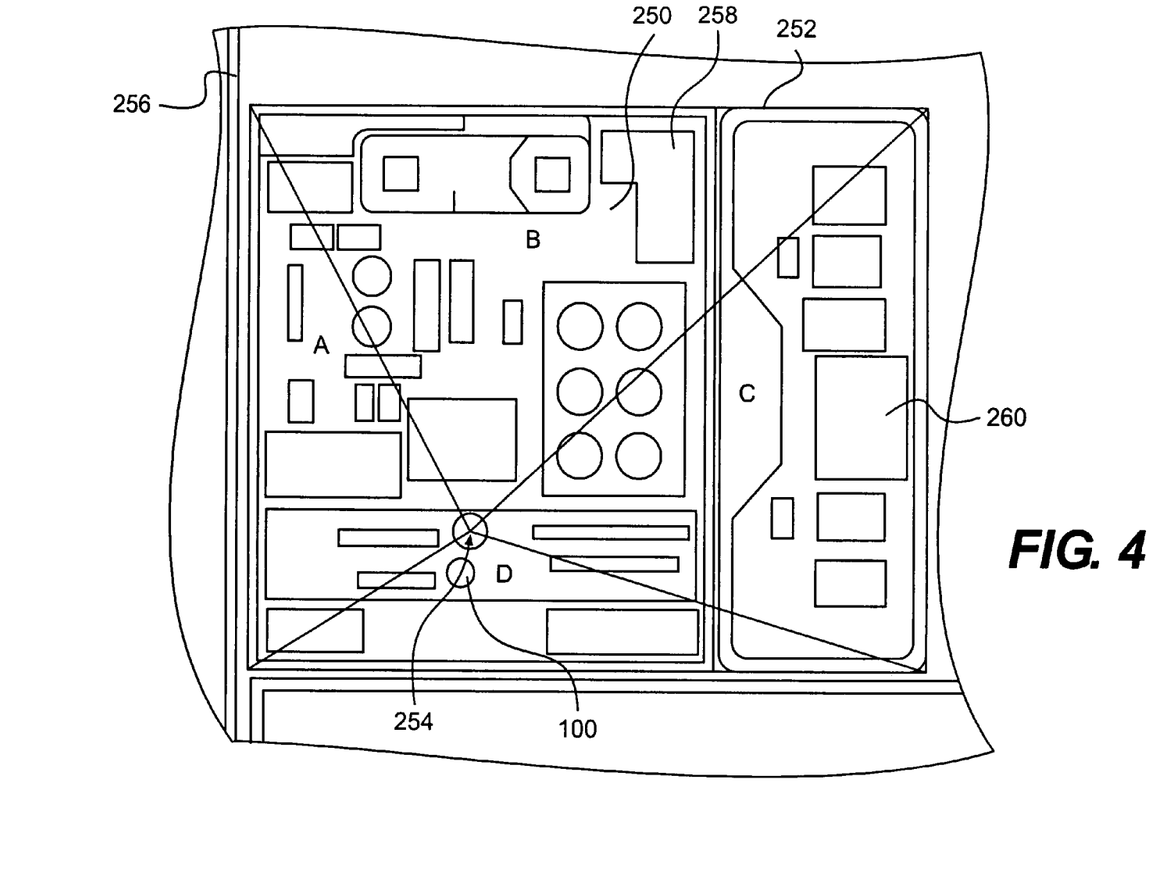
FIG. 4 illustrates a specific implementation of the controller of FIG. 1B.

A specific implementation of the INAC 100 is to control (e.g., block) wireless communications among a prison population while at the same time allowing prison guards and staff to use the underlying macro wireless network 70. This implementation is illustrated in FIG. 4, wherein a prison facility 250 is defined by perimeter 252. Installed within the perimeter 252 is INAC 100, and corresponding transmission equipment 254, which includes a base station, amplifier, RF distribution module, and one or more antennas. The antennas may be directional, and serve to define a number of sectors A-D as shown. Adjacent to the perimeter 252 is a road 256 over which everyday traffic may pass. Users inside the perimeter 252 with unauthorized devices 20 have their devices locked to the INAC 100. The precise boundary (i.e., the perimeter 252) of the prison facility is known and stored with the INAC 100. Any authorized device 20 located within the perimeter 252 may be passed to the underlying macro wireless network 70, after verification by the INAC 100. Unauthorized devices 20 ordinarily are locked to the INAC 100, but may be passed to the macro wireless network 70 and the ensuing conversation, text, or data may be recorded. Because the coverage area established by the INAC 100 may "overlap" the perimeter, devices 20 outside the boundary may initially lock to the INAC 100. After verification that such a device is not restricted, the device 20 may be passed to the macro wireless network 70.

The installation of the local wireless network 10 at the prison 250 may be at a finer-grained level than simply the prison boundary 252. For example, a cell block 260 may be designated as the only restricted access area for wireless devices 20, such that any wireless device 20 brought into the cell block 260 is locked to the INAC 100. Alternatively, only unknown and restricted wireless devices within the precise boundaries of the cell block 260 are locked to the INAC 100. In another embodiment, the local wireless network 10 can be set-up to cover all of the area (x, y, z) within the boundaries of the prison 250, except the precise boundaries of administration building 258, where access to the underlying macro wireless network 70 is permitted. Finally, the level of access to the macro wireless network 70 may vary from one sector (A-D) to another in the prison 250.

Thus, by using the precise two- or three-dimensional boundary data for a specific building, facility, or geographic location, locking a wireless device 20 to the INAC 100 may be accomplished at virtually any level of granularity. For example, wireless devices 20 may be locked to the INAC 100 when brought into a room in an office building, into a cell block in a prison, or onto a mobile platform, such as an airplane, while other wireless devices 20 outside the room, cell block, or airplane, are connected to the macro wireless network 70.

Installation of the INAC 100 as part of a network, or as a standalone device can be permanent or temporary. For example, the INAC 100 may be available as a mobile device, along with the necessary amplifiers, RF distribution, antennae and repeaters, so that a disaster recovery operation may invoke wireless access restrictions in the area where the disaster recovery is taking place. Upon completion of the disaster recovery operations, the access limitation area is disestablished.

The INAC 100 may also provide the capability to individually access the locked wireless devices overtly or covertly thus allowing the exchange of information or enabling the ability to provoke action from the wireless device. For example, devices 20 locked to the INAC 100, as noted above, may be queried to determine their geographical (GPS) location. Other devices 20 may be turned on so as to monitor conversations capable of detection by the device's microphone.

The preceding description of the INAC 100 referred to its use in restricting wireless communications. However, the INAC 100 also may be used to enable (and thus control)

wireless communications in the RF coverage area of the local wireless network 10. For example, a theme park may establish a local wireless network using the INAC 100. The theme park may provide its own devices 20 to theme park customers, and permit certain wireless communications within the theme park using the theme park-owned devices. The communications may be used by one family member to track another family member, to provide news updates to customers with the theme park-owned devices, and for other purposes. In this implementation of the INAC 100, the existing macro wireless network may continue to function, and the user-owned devices 20 would communicate as normal over the macro wireless network.

Another implementation of the INAC 100 to provide wireless communications involves establishing a VIP service to local customers. In this implementation, the INAC 100 serves VIP customers (using those customers' normal devices) and directs all other customers to the underlying macro wireless network. This VIP service can be used in virtually any location or situation, including at prisons to provide a communications network for guards and other staff, at embassies to provide secure wireless communication, at shopping malls, office complexes, military installations, onboard a ship at sea or an airplane in flight above a specific altitude, for example. Because only registered devices 20 can communicate over the local wireless communications network, security may be enhanced, and unauthorized wireless communications prevented while the underlying macro wireless network continues to function as normal.

Figure 5:
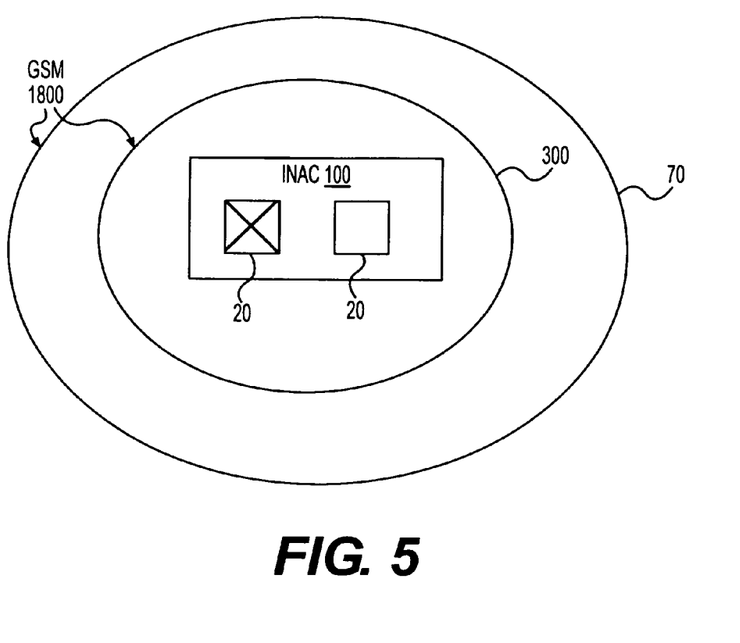
FIG. 5 illustrates a single technology implementation of the controller of FIG. 1B.
Figure 6:
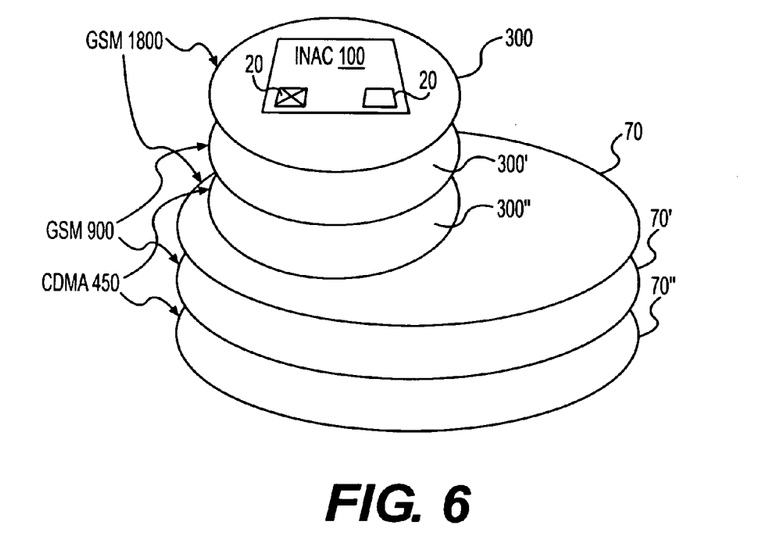
FIG. 6 illustrates a multiple technology implementation of the controller of FIG. 1B.

As noted above, the INAC 100 may be used to control wireless access for one wireless technology, and/or for one frequency range, or for multiple technologies and frequency ranges. FIGS. 5 and 6 show this functionality, with examples of current wireless protocols illustrated. One skilled in the art will appreciate that other protocols would apply equally, including wireless protocols to be developed in the future. In FIG. 5, the INAC 100 is used to create restricted wireless access area 300 as an overly to the macro wireless network 70, where the network 70 and the restricted access area 300 are based on GSM 1800 protocols. In FIG. 6, three wireless technologies are shown and, correspondingly, three restricted access areas (300, 300', 300"). In a further alternative, the INAC 100 may be used to create restricted access areas for only a subset of the protocols of a multi-protocol wireless network.

FIGS. 7A-7D illustrate embodiments of methods for creating a local wireless network and for dynamically controlling wireless communications using the local wireless network.

The invention claimed is:

1. An intelligent network access controller (INAC), tangibly embodying a program of instructions readable by the INAC to perform steps of a process that creates a local wireless network and that dynamically controls access by wireless devices to a macro wireless network overlaying or underlying the local wireless network, the steps, comprising:
   registering the wireless devices, wherein the devices are identified and classified, and wherein the devices comprise one of allowed, restricted, and unknown;
   dynamically determining characteristic values of the devices;
   dynamically granting access by the devices to the macro network based on the dynamically determined characteristics of the devices; and
   locking devices to the local wireless network based on the dynamically determined characteristics.

2. The INAC of claim 1, wherein registering comprises identifying the devices based on one or more of phone number, subscription information, and equipment identification number.

3. The INAC of claim 1, wherein dynamically determining characteristic values, comprises:
   determining locations of the devices;
   determining call features of the devices; and
   determining restriction times in the local wireless network.

4. The INAC of claim 3, wherein determining locations of the devices comprises:
   determining location by GPS;
   determining location by triangulation of signal strength; and
   querying the underlying or overlaying macro wireless network to provide the locations.

5. The INAC of claim 4, wherein determining locations of the devices further comprises correlating data from one or more databases, the one or more databases including unsorted data indicative of the locations of the devices.

6. The INAC of claim 1, the steps further comprising intercepting, monitoring, and recording communications over the local wireless network.

7. The INAC of claim 6, wherein the intercepting, monitoring, and recording are performed at the local wireless network.

8. The INAC of claim 6, wherein the intercepting, monitoring, and recording comprises:
   intercepting performed at the local wireless network; and
   monitoring and recording performed at the macro wireless network.

9. The INAC of claim 1, wherein the local wireless network is established on one of an airplane, a ship, and a train.

10. The INAC of claim 9, wherein locking locks the devices to the local wireless network based on an operational profile of the airplane, ship, or train.

11. The INAC of claim 10, wherein an operational profile of the airplane includes one of flying, defined as access doors shut, and not flying.

12. The INAC of claim 11, wherein flying is further defined as altitude less than a pre-determined value above ground.

13. The INAC of claim 1, the steps further comprising establishing a private network within a RF coverage area the local wireless network.

14. The INAC of claim 1, the steps further comprising creating a VIP service within a RF coverage area of the local wireless network, wherein allowed devices are directed to the VIP service and wherein restricted and unknown devices are re-directed to the macro wireless network.

15. A computer-implemented method for controlling access by wireless devices to a macro wireless network, comprising the steps of:
   establishing a local wireless network having a determined RF coverage area as an overlay to the macro wireless network;
   detecting when the devices enter the RF coverage area of the local wireless network;
   dynamically determining one or more characteristics of the devices and one or more characteristics of the RF coverage area; and
   based on the dynamically determined characteristics, either:
      locking the devices to the local wireless network, or
      passing the devices to the macro wireless network.

16. The method of claim 15, further comprising registering the devices with the local wireless network based on one or more of phone number and equipment identification number.

17. The method of claim 15, wherein dynamically determining characteristic values comprises:
- determining locations of the devices; determining call features of the devices; and
- determining restriction times in the local wireless network.

18. The method of claim 17 wherein determining locations of the devices comprises one or more of:
- determining location by GPS;
- determining location by voice recognition; determining location by activation of a device camera;
- determining location by activation of a device microphone;
- determining location by triangulation of signal strength; and
- querying the macro wireless network to provide the locations.

19. The method of claim 17, wherein determining locations of the devices further comprises correlating data from one or more databases, the one or more databases including unsorted data indicative of the locations of the devices.

20. The method of claim 15, further comprising intercepting, monitoring, and recording communications over the local wireless network.

21. The method of claim 20, wherein the steps of intercepting, monitoring, and recording are performed at the local wireless network.

22. The method of claim 20, wherein the step of intercepting, monitoring, and recording comprises:
- intercepting the communications at the local wireless network; and
- monitoring and recording the communications at the macro wireless network.

23. The method of claim 15, further comprising establishing a private network within a RF coverage area the local wireless network.

24. The method of claim 15, further comprising creating a VIP service within a RF coverage area of the local wireless network, wherein allowed devices are directed to the VIP service and wherein restricted and unknown devices are re-directed to the macro wireless network.

25. A system for controlling access to existing wireless networks, comprising:
- RF signal generation equipment that creates a local RF signal receivable by wireless devices, whereby a local wireless network is created; and
- a controller, implemented on a suitably programmed processor coupled to the RF signal generation equipment, comprising:
  - a location module that creates a limited coverage volume of the local wireless network, wherein the limited coverage volume is a volume less than the effective coverage volume of the local wireless network,
  - an identity module that identifies wireless devices within the limited coverage volume of the local wireless network,
  - an access module that determines a level of access to the existing wireless network, wherein the levels of access comprise one of allowed and blocked, and
  - a locking module that locks wireless devices with a blocked level of access to the local wireless network when the devices with the blocked level of access are within the limited coverage volume of the local wireless network.

26. The system of claim 25, wherein the limited coverage area defines a targeted environment.

27. The system of claim 26, wherein the targeted environment is one of a prison, a jail, a detention center, and a correctional facility.

28. The system of claim 26, wherein the targeted environment includes government buildings and Embassies.

29. The system of claim 26, wherein the targeted environment includes temporary and permanent military installations.

30. The system of claim 26, wherein the targeted environment includes nuclear facilities, power plants, and oil refineries.

31. The system of claim 26, wherein the targeted environment includes mobile platforms.

32. The system of claim 25, wherein the location module receives desired boundary information for the limited wireless network, the boundary information including x, y, and z coordinates, whereby the limited coverage volume is defined.

33. The system of claim 32, wherein the received boundary information comprises one or more of GPS information, boundary information from a database, and dead reckoning information.

34. The system of claim 33, wherein the boundary information changes with time.

35. The system of claim 25, wherein the location module comprises a wireless device location sub-module, wherein wireless devices are located relative to the limited coverage volume by one or more of GPS, dead reckoning, triangulation of signal strength, querying an existing wireless network to provide locations, and correlating data from one or more databases, the one or more databases including unsorted data indicative of wireless device locations.

* * * * *